Figure 1:
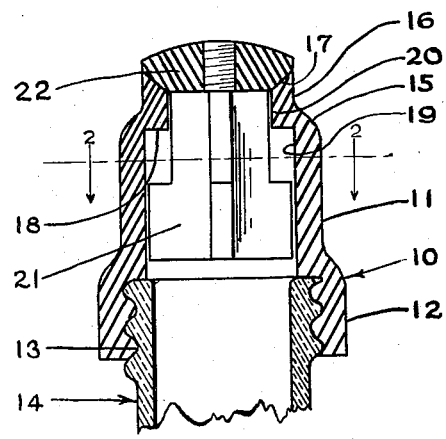

Nov. 28, 1939.  H. H. MARTIN  2,181,335

DISPENSING CLOSURE

Filed May 21, 1937

Herman H. Martin
INVENTOR

BY- Freeman, Swift, Albrecht, & Weidman.
ATTORNEYS

Patented Nov. 28, 1939

2,181,335

UNITED STATES PATENT OFFICE 2,181,335

DISPENSING CLOSURE

Herman H. Martin, Toledo, Ohio, assignor to H. H. Martin Products Corporation, Cleveland, Ohio, a corporation of Ohio Application May 21, 1937, Serial No. 144,023

5 Claims. (Cl. 215—74)

This invention relates to dispensing closures for liquid containers and the like, and has for an object the provision of a new and improved closure of this character.

Figure 2:
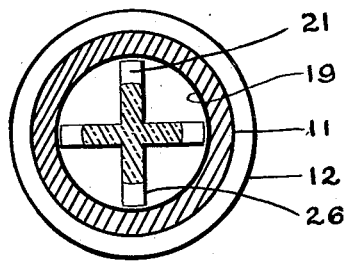
Figure 3:
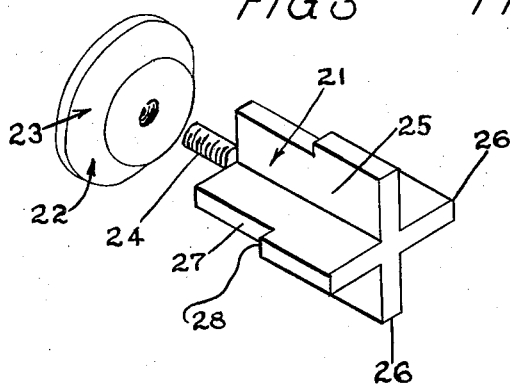
Figure 4:
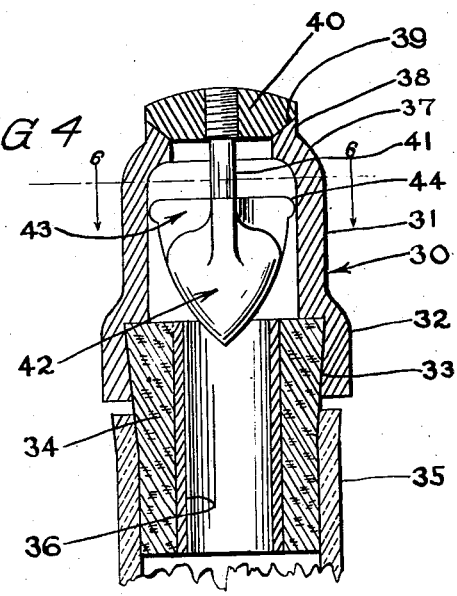
Figure 5:
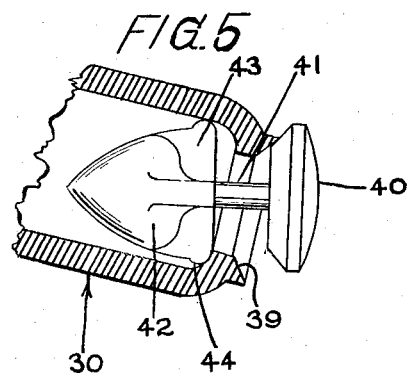
Figure 6:
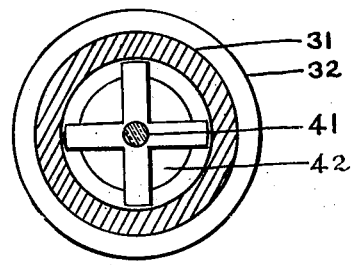

In the drawing accompanying this specification and forming a part of this application, I have shown, for purposes of illustration, embodiments which my invention may assume, and in the drawing:

Figure 1 is a vertical sectional view of an embodiment of the invention, partly in elevation, a portion of the liquid container being broken away, Figure 2 is a horizontal sectional view, corresponding substantially to the line 2—2 of Figure 1, Figure 3 is an enlarged, exploded, perspective view, of the closure means proper, Figure 4 is a vertical sectional view, partly in elevation, disclosing a different embodiment of the invention, and showing the closure means in closed position, Figure 5 is a fragmentary, part sectional, part elevational view, similar to Figure 4, showing the closure means in open position, while Figure 6 is a horizontal sectional view, corresponding substantially to the line 6—6 of Figure 4.

As shown in Figures 1 through 3 of the drawing, the embodiment of the invention comprises a closure casing 10, having a preferably cylindrical body section 11, integrally merging at the bottom with an enlarged section 12, the inner surface of which is threaded, as at 13, for engagement with a thread on the neck 14 of a liquid container. The upper portion of the cylindrical section 11 is tapered inwardly, as at 15, and merges with a reduced cylindrical section 16, the inner edge surface of which is beveled to provide a tapered seat 17, while the interior of the cylindrical section 11, adjacent its juncture with the tapered portion 15, is provided with an annular shoulder 18, separating a larger interior diameter 19 of the casing from the smaller interior diameter 20.

The entire casing 10, as described, is integral throughout, preferably being molded from a composition known in the trade as "plaskon", or from "Bakelite", or from any other material, which will be impervious to the action of spiritous liquors dispensed therethrough, and which will not contaminate the liquor even though the casing is used for a long time.

Cooperating with the casing 10 are closure means proper, indicated as an entirety by the reference character 21, and comprising a closure member 22, having a beveled surface 23, adapted to fit the tapered seat 17, the closure member 22 preferably being composed of "plaskon", and threaded upon a threaded stud 24, forming part of a guide member 25. The guide member 25, including the stud 24, is of molded material, preferably glass, and comprises radial longitudinally extending ribs 26, slidably accommodated in the larger diameter 19 of the casing 10, and shorter radial ribs 27, slidably accommodated within the smaller diameter of the casing 10, the ribs 26 and 27 being longitudinally aligned, and separated by shoulders 28, adapted in one position of the parts to abut the annular shoulder 18 of the casing 10, to limit outward movement of the guide member 25. The closure means 21 are initially assembled by inserting the guide member 25 into the casing 10 through the relatively large open end of the casing, and the threaded stud 24 projected from the mouth of the casing, after which the closure member 22 is threaded onto the stud 24.

When the liquid container is in an upright position, the weight of the guide member 25 holds the closure member 22 in closed position; when the liquid container is tilted, the guide member 25 moves outwardly until the shoulders 28 abut the annular shoulder 18, unseating the closure member 22, permitting liquid to pass through the channels defined by the ribs 26 and 27, and outwardly past the closure member 22.

Referring to Figures 4 through 6, another embodiment of the invention is disclosed, comprising a casing 30, having a preferably cylindrical body portion 31, integrally merging at the bottom with an enlarged section 32, the inner surface of which is provided with an undercut socket 33 for the reception of the tapered end of an adapter 34, preferably of cork, and insertable into the neck 35 of a liquid container, a tube 36 of "plaskon" or similar material extending centrally through the adapter to protect the material of which the adapter is made from the action of the contents of the liquid container, and to protect the liquid from contamination. The upper portion of the cylindrical section 31 is tapered inwardly, as indicated at 37, and merges with a reduced section 38, the inner surface of which is beveled to provide a beveled seat 39.

Cooperating with the casing 30 is a closure disc 40 preferably of "plaskon", having a central bore threaded for the reception of a stem 41, integrally formed with a weighted section 42, the stem and weighted section 42 being molded from suitable material, preferably glass. Formed integrally with the upper portion of the weighted section 42 are radial extensions 43, preferably four in number, and at their outer ends the extensions 43 have rounded fulcrum means 44. In this embodiment of the invention the stem 41, and weighted section 42, are inserted from the larger open end of the casing 30, after which the closure member 40 is threaded thereon, and the adapter member 34 thereafter applied. When the liquid container is in an upright position, the weighted section 42 holds the closure 40 to its seat; when the liquid container is tilted, one or more of the fulcrum points 44 of the extensions 43 will engage one side of the casing 30, adjacent the outlet orifice, and will tilt the closure member 40 to the position shown in Figure 5, permitting flow of liquid therepast. When the container is restored to an upright position the weighted section 42 returns the closure to its closed position.

It will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. Closure means for containers, comprising: a hollow body portion having a reduced section terminating in a pouring opening; and closure means for said opening, including an exterior closure, and interior operating means having a section reciprocably fitting said hollow body portion and a connected section reciprocably fitting said reduced section, said operating means being constructed and arranged to shift said closure to open said pouring opening when said container is moved out of predetermined position, and to return said closure means to closing position when said container is returned to predetermined position, and having channel means to allow passage of liquid therepast when in position to open said closure.

2. Closure means for containers, comprising: a hollow body portion having a reduced section terminating in a pouring opening; and closure means for said opening, including an exterior closure, and elongated interior operating means having a section comprising radially extending spaced ribs reciprocably fitting said hollow body portion and a connected section comprising radially extending ribs longitudinally aligned with the ribs of said first section and reciprocably fitting said reduced section, said operating means being constructed and arranged to shift said closure to open said pouring opening when said container is moved out of predetermined position, and to return said closure means to closing position when said container is returned to predetermined position, said ribs defining channel means to allow passage of liquid therepast when in position to open said closure and forming stop means to limit movement of said operating means.

3. A device of the character described, comprising: elongated tubular means having one end adapted to be connected to a liquid container, and the opposite end provided with a pouring opening; a closure for said pouring opening, positioned, and operating, externally of said tubular means; and weighted means within said tubular means of such size as to be freely movable laterally and longitudinally within the interior of said tubular means, and of a size larger than said pouring opening, said closure means and said weighted means having rigid connecting means therebetween, extending loosely through said pouring opening, said connecting means being of relatively small size as compared to said pouring opening as to permit considerable longitudinal tilting therein, and of such length that all parts of said closure means and said weighted means are spaced longitudinally an appreciable distance from each other, said weighted means, said closure means, and said connecting means, being so constructed and arranged whereby movement of said container toward a substantially horizontal position gravity actuates said weighted means to swing laterally, tilt, and maintain tilted, said connecting means and said closure means, in a direction opposite to the direction of movement of said container to open said pouring opening; said weighted means having fulcrum means projecting laterally therefrom, and cooperating in the tilting movement of said weighted, closure, and connecting means.

4. A device of the character described, comprising: elongated tubular means having one end adapted to be connected to a liquid container, and the opposite end formed with a neck of appreciable length, provided at its outer end with a pouring opening; a closure for said pouring opening, positioned, and operating, externally of said tubular means; and weighted means within said tubular means of such size as to be freely movable laterally and longitudinally within the interior of said tubular means, and of a size larger than said pouring opening, said closure means and said weighted means having rigid connecting means therebetween, extending loosely through said neck and said pouring opening, said connecting means being of relatively small size as compared to said neck and pouring opening as to permit considerable longitudinal tilting therein, and of such length that all parts of said closure means and said weighted means are spaced longitudinally an appreciable distance from each other, said weighted means, said closure means, and said connecting means, being so constructed and arranged whereby movement of said container toward a substantially horizontal position gravity actuates said weighted means to swing laterally, tilt, and maintain tilted, said connecting means and said closure means, in a direction opposite to the direction of movement of said container to open said pouring opening; said weighted means having fulcrum means projecting laterally therefrom, and cooperating in the tilting movement of said weighted, closure, and connecting means.

5. A device of the character described, comprising: elongated tubular means having one end adapted to be connected to a liquid container, and the opposite end provided with a pouring opening; a closure for said pouring opening, positioned, and operating, externally of said tubular means; and weighted means within said tubular means of such size as to be freely movable laterally and longitudinally within the interior of said tubular means, and of a size larger than said pouring opening, said closure means and said weighted means having rigid connecting means therebetween, extending loosely through said pouring opening, said connecting means being of relatively small size as compared to said pouring opening as to permit considerable longitudinal tilting therein, and of such length that all parts of said closure means and said weighted means are spaced longitudinally an appreciable distance from each other, said weighted means, said closure means, and said connecting means, being so constructed and arranged whereby movement of said container toward a substantially horizontal position gravity actuates said weighted means to swing laterally, tilt, and maintain tilted, said connecting means and said closure means, in a direction opposite to the direction of movement of said container to open said pouring opening; and fulcrum means interposed between said weighted means and said closure means, and carried by and movable with said weighted means, closure means, and connecting means.

HERMAN H. MARTIN.